(12) United States Patent
George et al.

(10) Patent No.: US 6,779,122 B2
(45) Date of Patent: Aug. 17, 2004

(54) METHOD AND APPARATUS FOR EXECUTING A LONG LATENCY INSTRUCTION TO DELAY THE RESTARTING OF AN INSTRUCTION FETCH UNIT

(75) Inventors: Varghese George, Folsom, CA (US); Tim W. Chan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 09/748,612

(22) Filed: Dec. 26, 2000

(65) Prior Publication Data

US 2002/0091912 A1 Jul. 11, 2002

(51) Int. Cl.[7] .................................................. G06F 1/30
(52) U.S. Cl. ........................ 713/330; 713/322; 712/205
(58) Field of Search .............................. 713/300, 320, 713/322, 330; 712/245, 219, 205

(56) References Cited

U.S. PATENT DOCUMENTS

| 5,414,863 | A | * | 5/1995 | Lee et al. ..................... 713/330 |
| 5,958,044 | A | * | 9/1999 | Brown et al. ................ 712/219 |
| 6,100,752 | A |   | 8/2000 | Lee et al. |
| 6,128,747 | A | * | 10/2000 | Thoulon ..................... 713/330 |

FOREIGN PATENT DOCUMENTS

| JP | 11306016 A | * | 11/1999 | ............. G06F/9/32 |
| JP | 2000222279 A | * | 8/2000 | ........... G06F/12/00 |

OTHER PUBLICATIONS

Larsson Mikael, Re: Variably clocked processors?, Aug. 5, 1994.*

* cited by examiner

Primary Examiner—Thomas Lee
Assistant Examiner—Mark Connolly
(74) Attorney, Agent, or Firm—John F. Travis

(57) ABSTRACT

A micro-code sequence to reduce the rate of change of current required by a processor coming out of a sleep mode when the processor clock is resumed. After stopping the instruction fetch unit, an instruction with a long latency, or execution time, can be initiated by the micro-code before the processor clock is stopped to enter a sleep mode. When the sleep mode is exited by resuming the processor clock, the instruction with the long execution time is completed before restarting the instruction fetch unit. This prevents a portion of the processor circuitry from resuming operation immediately when the clock is resumed, which also delays some of the current demands made by that portion of the circuitry. This creates a more gradual increase in the current required by the processor when exiting a sleep mode.

26 Claims, 4 Drawing Sheets

METHOD AND APPARATUS FOR EXECUTING A LONG LATENCY INSTRUCTION TO DELAY THE RESTARTING OF AN INSTRUCTION FETCH UNIT

BACKGROUND OF THE INVENTION

1. Field of the Invention

The invention pertains generally to computers. In particular, it pertains to reducing current surges during the operation of microprocessors.

2. Description of the Related Art

Many motherboard designs use voltage regulators to supply the power requirements of high performance processors (CPUs). These voltage regulators attempt to keep a constant voltage level as the current requirements of the CPU change. However, voltage regulators have a minimum response time, so if the current demand increases too quickly, the CPU may experience a temporary drop in its supply voltage until the voltage regulator can respond to this increased current demand. The rate of change in current is commonly expressed as di/dt, indicating the amount of change in current divided by amount of time during which the change occurs.

Unfortunately, the current requirements of conventional processors can vary suddenly and considerably during operation as the processors go into and out of various power saving modes. At least one power saving mode, commonly referred to as a sleep mode, stops the clock that controls the processor circuitry. Since processor clocks can operate at a speed of hundreds of megahertz, it may require only a very small fraction of a microsecond for a processor enter or exit a sleep mode, and the processor's electrical current requirement can change just as rapidly.

A conventional processor enters a sleep mode after the processor receives a signal requesting it to stop its clock. This stop-clock signal can be generated by an external power management circuit and received on an input pin of the processor. Alternately, it might be generated internally when the CPU executes a HALT instruction. There are typically processes in work in the CPU that should be completed before entering a sleep mode, so when the stop-clock signal is received, the processor will go through a sequence in its micro-code that performs several functions. These functions typically include:

1) Stop the instruction fetch unit from fetching instructions.
2) Wait for the cache buffers to finish writing data into cache, so that no cache data will be lost.
3) Wait for the processor bus output queue to finish writing data onto the processor bus, so that all pending writes from the CPU can reach their destination.
4) Write to a control register to turn the processor clock off.

At this point, the processor clock (or clocks, if more than one processor clock is being used) stops, which freezes all internal operations in the CPU. When an event occurs to bring the processor out of sleep mode, the clock will be restarted. This might occur by removing the stop-clock signal from the CPUs input pin, or it could be triggered by an interrupt. In either case, when the clock is restarted, the CPU continues execution of the instruction that was being executed when the clock stopped. After execution of that instruction is completed, the micro-code sequence performs another step by restarting the instruction fetch unit. This permits execution of program instructions to return to normal.

When the clock is restarted, it may only take one clock cycle for the current instruction to complete its execution and the instruction fetch unit to be turned on. This effectively causes all circuitry involved in instruction execution to begin operating at the same time, and the cumulative current requirements of all this circuitry place a substantially increased current demand on the system within one clock cycle. The voltage regulator cannot keep up with this high di/dt requirement, and a drop in voltage may be experienced by the CPU. If this drop is large enough, it can cause errors in CPU operation.

Conventional designs attempt to minimize this problem by placing bulk decoupling capacitors between the output of the voltage regulator and the voltage inputs of the CPU. The charge stored in these capacitors can supply some of the current needed until the voltage regulator can respond. However, this approach has several drawbacks. Capacitors are expensive, and require a lot of space that could be used for other circuit needs. Also, capacitors on the motherboard may be too far away from the current-consuming portions of the CPU chip to supply the needed current quickly enough. Although capacitors can be designed into the chip itself, these also require space that could be better used for other circuitry.

DETAILED DESCRIPTION OF THE INVENTION

When entering a sleep mode in which the processor clock is stopped, a long latency instruction can be inserted into the execution logic before the processor clock is turned off. A long latency instruction is an instruction that takes a comparatively large number of clock cycles to complete. For example, a floating-point divide instruction might take 30 clock cycles to complete, whereas many other instructions would take only one to five cycles to complete. When the processor clock is restarted to exit the sleep mode, the instruction fetch unit is not turned on until this long latency instruction completes, so no work will be performed by the instruction fetch and dispatch circuitry during this time and their power consumption will be minimal. This delays some of the overall increase in current until the long latency instruction is completed, resulting in a more gradual increase in current that can be handled with fewer decoupling capacitors than in a conventional system.

Figure 1:
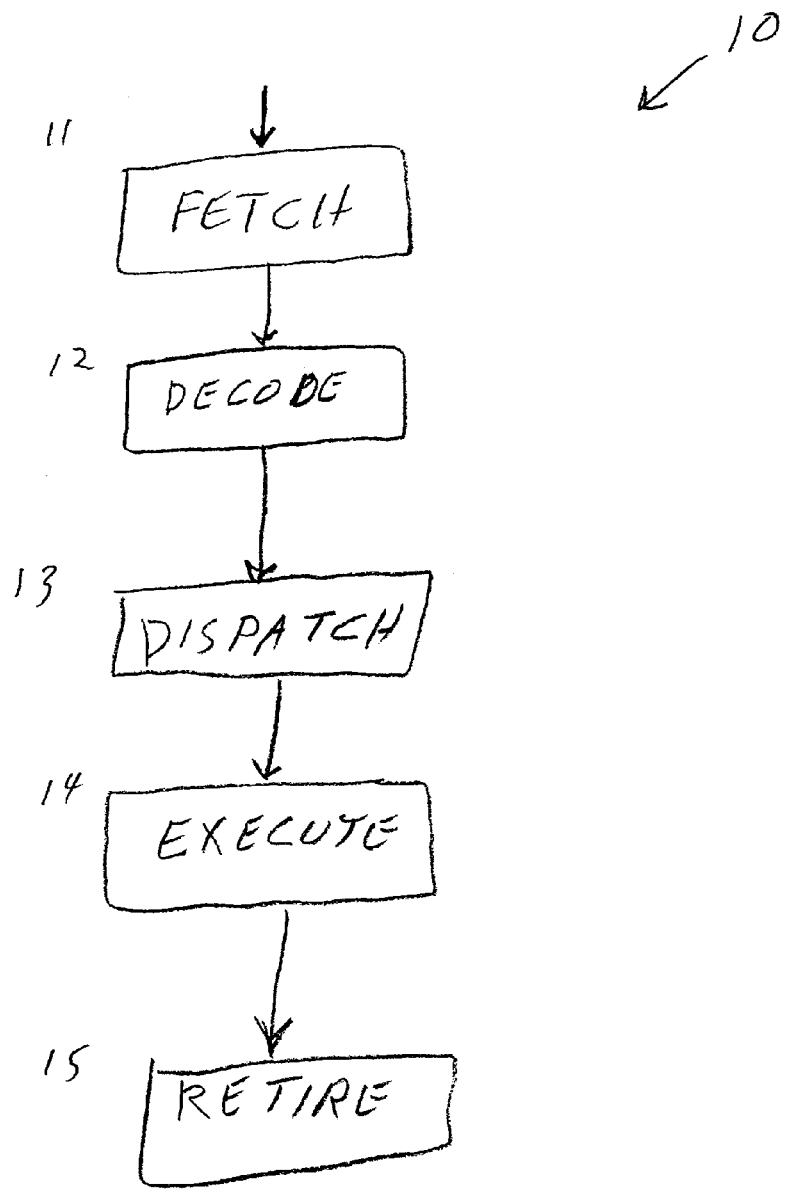
FIG. 1 shows a functional diagram of instruction processing logic.

FIG. 1 shows the functional units of the instruction processing logic in a processor. These blocks can be considered as either steps in the process, or as functional units of hardware that perform the indicated functions. However, the hardware functional units may or may not be physically connected as shown. At block 11, the instruction fetch unit fetches the next instruction in the instruction flow from the instruction cache. The fetched instruction can then be decoded at block 12 by the decode circuitry. The decode circuitry can transform the instruction into several microinstructions that must be performed for the full instruction to be executed. These microinstructions can then be distributed by the dispatch unit at block 13 to various execution units at block 14. Different execution units can be specialized for specific types of execution. Multiple execution units of the same type may also be employed so that parallel processing can be used to speed up the overall operation. Execution may also be performed on different instructions out of order. When an instruction has been executed, it can be retired at block 15. The retirement unit can re-order instructions that were executed out of order, so that program register contents will be written in the order dictated by the program flow.

The code for executing each of the various microinstructions can be located in a micro-code read-only memory (micro-code ROM). This ROM can contain brief sections of micro-code that define the various functions of mathematical, logical, and data movement activities that take place when an instruction is executed. The microinstruction ROM can contain all the sections of micro-code for all instructions that can be executed by the computer, with each particular instruction accessing only a few of these sections. Execution of micro-code can be controlled by the processor clock, and will stop when the processor clock stops.

Some functions can also be performed in the micro-code ROM without being initiated by a formal instruction in the program flow. For example, although the microinstructions necessary to enter a sleep mode can be triggered by a 'halt' instruction in the program flow, they can also be triggered by a hardware signal, such as a stop-clock signal that indicates the status of a bit in a hardware register. That bit in the register can in turn be controlled by various circuits that are not directly responsive to program flow, and may even be external to the processor itself. In one embodiment, one state of the stop-clock signal can be used to trigger entry into the sleep mode, and the other state of the stop-clock signal can be used to resume the processor clock after it has been stopped.

The steps necessary to enter and exit a sleep mode can be placed in the micro-code ROM. Each step can consist of one or more individual micro-code "instructions" that are executed sequentially. By entering and exiting the sleep mode within a single sequence of micro-instructions, execution of these micro-instructions can continue without dependence on, or knowledge of, the length of time spent in the sleep mode. These steps can be as follows:

1) Stop the instruction fetch unit (IFU).
2) Wait for the cache buffers to finish writing data into cache.
3) Wait for the processor bus output queue to finish writing data onto the processor bus.
4) Initiate execution of a long latency instruction.
5) Turn the processor clock off.
6) Restart the IFU after completion of the long latency instruction.

After completion of step 5, operation of the microcode can stop when the processor clock stops. When the processor clock is later resumed, execution of the microcode can continue from the point at which it stopped. Since the state of the processor is largely frozen when the processor clock is stopped, and since the processor clock can be resumed by circuitry external to the processor, the resumption of the clock does not have to be comprehended by the micro-code. Resuming the processor clock permits execution of the long latency instruction to continue to completion. After such completion, the IFU can be restarted.

When the processor clock is restarted, the long latency instruction is in the midst of execution, so the Execute circuits begin operating immediately. The Retire circuits may begin operating immediately if there is any residual instruction in the retirement phase at the time the clock is resumed. However, the Dispatch circuits may not be able to do anything useful because they are waiting for the Execute circuits to complete their current operation and accept another set of microinstructions. The Decode circuits may be similarly waiting on the Dispatch circuits to become available, and the Fetch circuits are not operating because they are still turned off. Thus, the Fetch/Decode/Dispatch portions of the pipeline (and possibly the Retire portion) can be effectively stalled until the Execute portion finishes executing the long latency instruction. For those circuits that are not operating because they are stalled, their need for electrical current can be minimal. When the long latency instruction completes execution, it will be passed on to the Retire circuits for retirement. At this point, the Execute circuits can accept inputs from the Dispatch circuits and the Dispatch circuits can then accept inputs from the Decode circuits. These circuits may or may not have residual instructions that were there when the processor clock was stopped, and so they may or may not begin operating immediately upon completion of the long latency instruction.

After execution of the long latency instruction is complete, the IFU is turned on and begins fetching instructions from the instruction cache. This resumption of activity in the IFU causes the IFU to begin drawing additional current. The Decode and Dispatch circuits can then begin performing their pipeline functions as they are fed by the IFU, if they were not already operating due to residual instructions.

Due to this stalled pipeline effect, the Execute circuitry (and sometimes the Retire circuitry) will begin drawing operational current immediately after the processor clock is resumed, but the Fetch/Decode/Dispatch circuits might not begin drawing operational current until after the long latency instruction has been executed. Thus, the increase in current after resuming the processor clock proceeds in at least two stages, providing a more gradual ramp-up of current that is closer to the voltage regulator's response time capabilities, and requiring fewer decoupling capacitors to make up for any remaining shortfall that might exist in the voltage regulator's response time.

Figure 2:
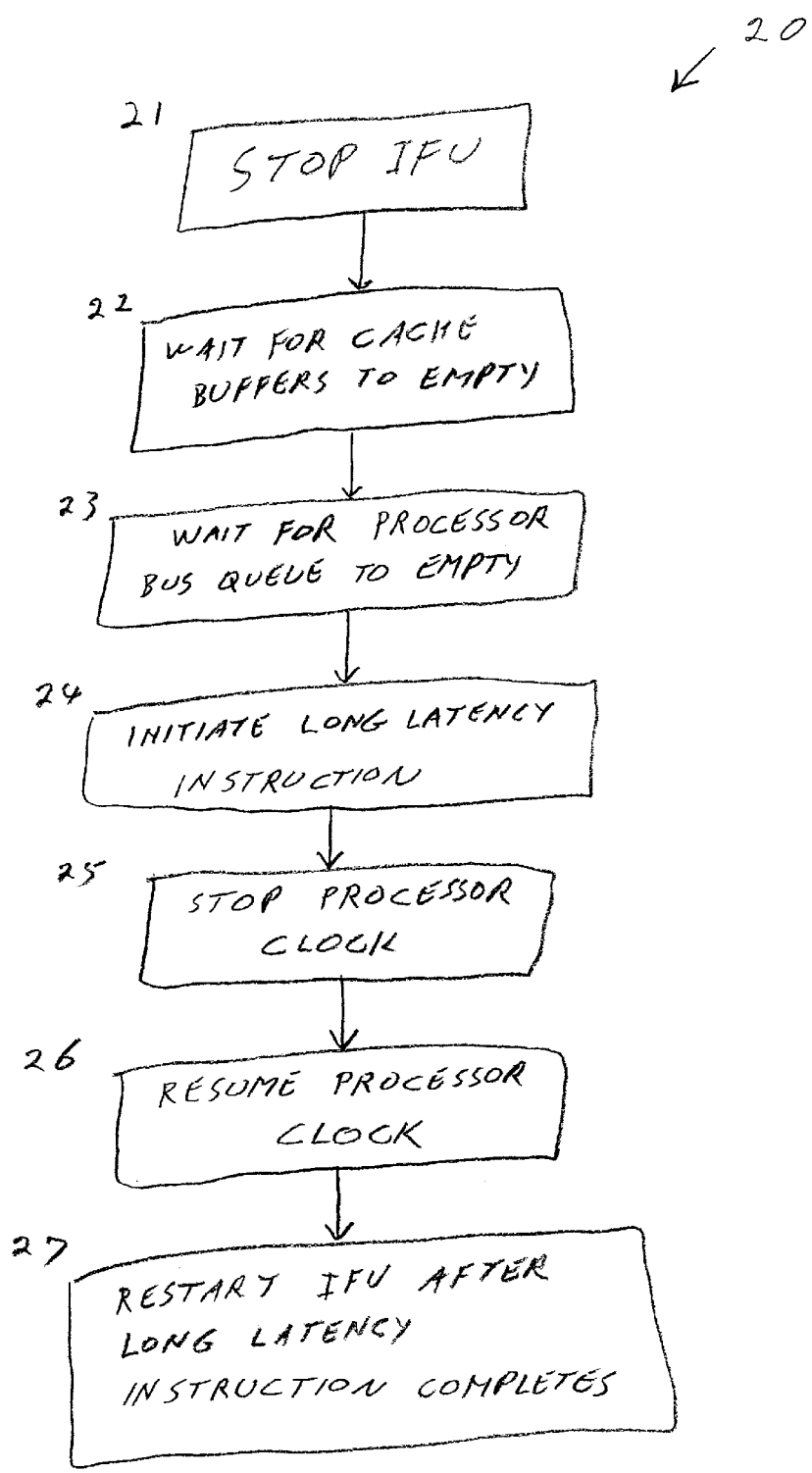
FIG. 2 shows a flow chart of a method.

With reference to FIG. 2, the following gives a more detailed description of the aforementioned steps, including those steps performed by the micro-code and one step (step 26) that can be performed external to the micro-code. The step numbers correspond to the steps illustrated in FIG. 2.

21) Stop the Instruction Fetch Unit (IFU).

This prevents the IFU from fetching any more instructions from the instruction cache. This can be done in various ways, such as by selectively turning off the clock signal to the IFU circuitry, or by blocking the inputs to the IFU. In any case, this step prevents any more instructions from feeding into the input of the instruction processing pipeline. Without a source of further work, the Decode and Dispatch circuits may also have time (during steps 22 and 23 below) to complete their operations on any residual instructions that they contained at the time the IFU was stopped.

22) Wait for the Cache Buffers to Empty by Writing Data into Cache.

This step is primarily to make sure that any cache lines being updated are complete. In some sleep modes, devices other than the CPU can still operate and access cache data, so this data should be correct before entering the sleep mode.

Waiting for the cache buffers to finish helps to assure this correctness. If entering a 'deep-sleep' mode, where nothing can access cache data, this step can be eliminated.

23) Wait for the Processor Bus Output Queue to Empty by Completing the Writing of Data onto the Processor Bus.

This step can assure that all transfers from the processor can reach their destination before entering sleep mode, so that any destination devices that will continue to operate during the sleep mode will have recent data to operate on. In some embodiments, this step can be eliminated.

24) Initiate Execution of a Long Latency Instruction.

A long latency instruction is an instruction that takes a relatively high number of processor clock cycles to execute, thus creating a delay in the execution flow that can be used later to delay the resumption of operation of some parts of the processor circuitry. The long latency instruction can be an existing instruction that takes a long time to execute, such as a floating-point divide instruction. Since the micro-code to execute existing instructions is already contained in the micro-code ROM, using an existing instruction can eliminate the need to modify the micro-code ROM. If the purpose here is simply to create a delay, rather than to compute a result, any result from execution of this instruction can be disregarded. Alternatively, a new instruction can be designed into the micro-code ROM specifically for the purpose of delay. Furthermore, this new instruction can be programmable in the duration of the delay. Since the response time of the voltage regulator is fixed, while the di/dt of the processor varies with processor clock frequency, having a programmable delay allows the processor's di/dt demand to be more closely matched to the voltage regulator's response over a wide range of processor clock frequencies. This in turn permits a given set of bulk decoupling capacitors to satisfy a wider range of processor frequencies. In one embodiment, the delay of this new instruction is contained in a one-time programmable read-only memory, such as programmable fuses. In one embodiment, the long latency instruction takes at least 25 cycles of the processor clock to complete, and in one particular embodiment takes 30 clock cycles to complete.

25) Stop the Processor Clock.

In one embodiment, this step takes place immediately (1 or 2 clock cycles) after initiating execution of the long latency instruction. Stopping the processor clock can freeze the state of the processor circuitry and stop processor operations, including the execution of micro-code. Thus the execution of the long latency instruction can be paused while the processor clock is stopped, and restarted after the processor clock is resumed. In one embodiment, stopping the processor clock can be accomplished by writing to a specific bit in a specific register that controls whether the processor clock is on or off. This register can be located off the processor so that it can be written to even when the processor clock is off. In one embodiment, this register is located in a power management circuit on a controller chip that controls data transfers between main memory, a graphics controller, one or more bus controllers, and the processor.

26) Resume the Processor Clock.

This step can be performed externally to the micro-code. In one embodiment, restarting the processor clock can be accomplished by writing to the same bit in the same register as in step 25. Restarting the processor clock can be initiated by various functions, including but not limited to: a) an interrupt, b) a timer timing out, or c) a signal from a device external to the processor.

27) Restart IFU After Completion of Long Latency Instruction.

Completion of the execution of the long latency instruction can be a continuation of step 4, rather than a separate step in the micro-code. When the sleep mode is exited by restarting the processor clock, the restarted clock enables the Execute circuitry to resume execution of the long latency instruction, which causes the Execute circuitry to suddenly begin drawing the current needed for its normal operation, rather than the much lesser current needed for non-operation in the sleep mode. Execution of the long latency instruction can then continue to completion. In one embodiment, the processor clock is stopped in step 25 after the long latency instruction has been executing for only 1 or 2 cycles, so most of the clock cycles required to execute the long latency instruction can take place after the processor clock is resumed. In one embodiment, completing execution of the long latency instruction requires at least 25 cycles, such as 30 cycles. After this completion, restarting the IFU permits new instructions to be fetched from the instruction cache. This in turn permits the Fetch/Decode/Dispatch/Execute/Retire pipeline to fill up and operate normally by feeding the input of the pipeline with new instructions. Up until this point, the IFU was not operating because it was turned off in step 21, so it did not require much current. However, once the IFU is restarted, it begins drawing the larger amount of current required for normal operations, so there can be a sudden increase in current load when the IFU restarts. Since an operating IFU feeds the Decode circuitry, which in turn feeds the Dispatch circuitry, the IFU, Decode, and Dispatch circuits may all begin operating within one or two cycles of each other. This can contribute further to the increase in current that occurs after the IFU is restarted.

Figure 3:
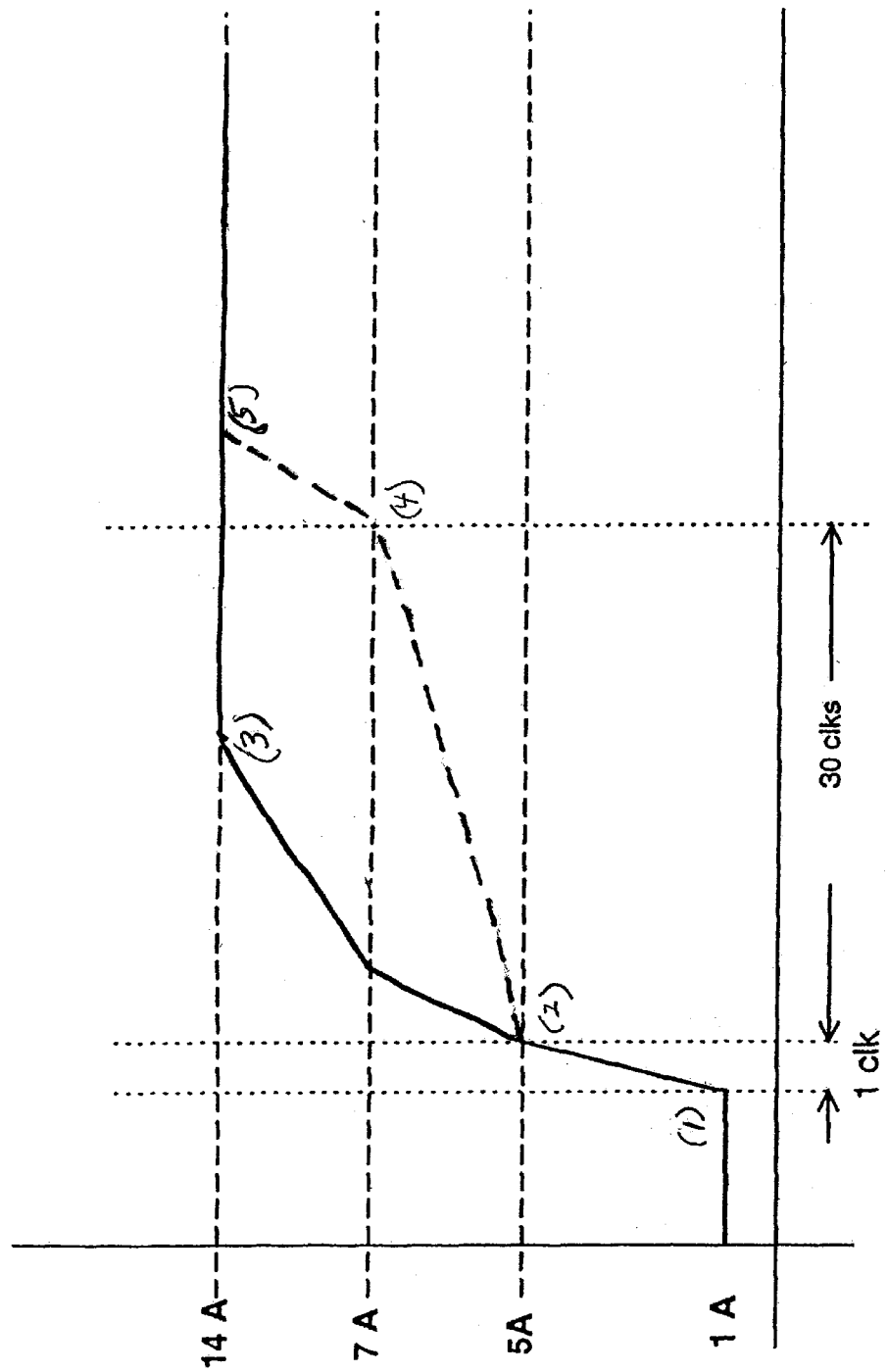
FIG. 3 shown a graph of current consumption after restarting a processor clock.

FIG. 3 shows a comparison between the di/dt of a conventional system exiting from a sleep mode and one embodiment of a system including the invention exiting from a sleep mode. The solid line can represent the current flow in the conventional system, while the dashed line can represent the current flow in the system using a long latency instruction. In the illustrated embodiment, the processor draws 1 amp (A) of current in the sleep mode. At point (1) the processor clock is restarted, and the execution circuitry begins operating, which ramps up the current consumption to 5 A at point (2). Up until this point, both systems can draw the same amount of current. Assuming the instruction being executed in a conventional system only takes one clock cycle to complete, at point (2) the instruction being executed completes, and the IFU is restarted. This permits the Decode and Dispatch circuits to begin operating a short time later, which brings current consumption up to the 14A shown at point (3). Point (3) may be reached only 2 or 3 clock cycles after point (1). However, if a long latency instruction is being executed, the IFU will not be restarted until that execution is complete, which may occur at point (4), approximately 25–30 cycles later. Between point (2) and point (4), the current consumption may ramp up slightly, due to the operation of the Execute circuitry bringing other circuits into play, but the final ramp up of current may not occur until the IFU is restarted at point (4). This brings the entire instruction execution pipeline into normal operation, which brings up current consumption to the final 14 A at point (5). Using a long latency instruction, point (5) may be more than 30 cycles after point (1), rather than the 3–4 cycles that point (3) in a conventional system trails point (1). This more gradual ramp up of the current allows more time for the voltage regulator to respond before the current in the decoupling capacitors is depleted, so that fewer decoupling capacitors are needed.

Figure 4:
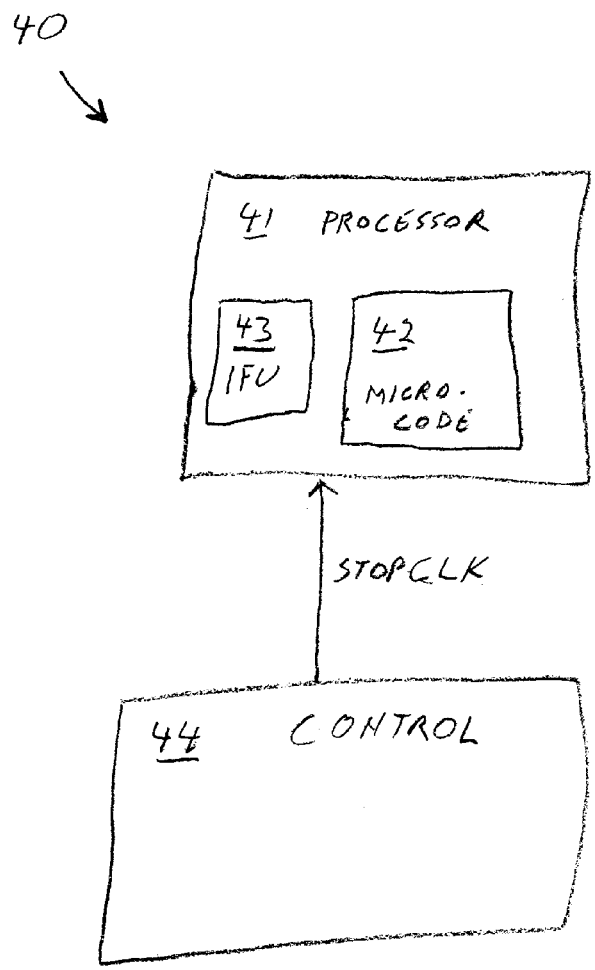
FIG. 4 shows a system for executing the method of FIG. 2.

FIG. 4 shows an embodiment of a system 40 having a processor 41 with an IFU 43 and microcode storage 42. Control circuit 44 can be used to control entry into, and exit from, a sleep mode in processor 41. If control circuit 44 asserts a stop-clock signal STOPCLK to processor 41, this assertion can be used by processor 41 to trigger the aforementioned sequence in microcode 42, which among other things, can stop the processor clock and place processor 41 into a sleep mode. Subsequently, control circuit 44 can deassert signal STOPCLK, which enables the processor clock, causing processor 41 to exit the sleep mode and begin operating again. Upon resumption of this operation, execution in microcode storage 42 can resume at the point at which it was stopped when the processor clock stopped. This can permit the aforementioned sequence to continue as described.

The invention can be implemented in circuitry or as a method. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. A method, comprising:
   executing a microcode sequence, comprising:
      stopping an instruction fetch unit from fetching instructions;
      initiating a long latency instruction;
      stopping a processor clock; and
      restarting the instruction fetch unit after completion of the long latency instruction.

2. The method of claim 1, further comprising:
   resuming the processor clock after stopping the processor clock and before completion of the long latency instruction.

3. The method of claim 2, wherein resuming is not executed by the microcode sequence.

4. The method of claim 1, further comprising:
   completing a transfer of data from a cache memory queue before initiating the long latency instruction.

5. The method of claim 1, further comprising:
   completing a transfer of data from a processor bus output queue before initiating the long latency instruction.

6. The method of claim 1, wherein initiating the long latency instruction includes initiating a floating point divide instruction.

7. The method of claim 1, wherein waiting includes waiting for more than 25 cycles of the processor clock.

8. The method of claim 1, wherein executing the microcode sequence is initiated by detecting a stop-clock signal.

9. The method of claim 1, wherein executing the microcode sequence is initiated by a halt instruction.

10. A machine-readable medium having stored thereon instructions, which when executed by a processor cause said processor to perform:
    executing a microcode sequence, comprising:
       stopping an instruction fetch unit from fetching instructions;
       initiating execution of a long latency instruction;
       stopping a processor clock; and
       restarting the instruction fetch unit after completing execution of the long latency instruction.

11. The medium of claim 10, wherein executing a microcode sequence further comprises:
    completing a transfer of data from a cache memory queue before initiating execution of the long latency instruction.

12. The medium of claim 10, wherein executing a microcode sequence further comprises:
    completing a transfer of data from a processor bus output queue before initiating execution of the long latency instruction.

13. The medium of claim 10, wherein initiating execution of the long latency instruction includes initiating execution of a floating point divide instruction.

14. The medium of claim 10, wherein execution of the long latency instruction requires at least 25 cycles of the processor clock.

15. An apparatus, comprising:
    a processor including:
       an instruction fetch unit;
       a processor clock;
       micro-code storage in the processor coupled to the instruction fetch unit and the processor clock and containing a plurality of microinstructions, wherein the micro-instructions comprise code to execute:
          stopping the instruction fetch unit from fetching instructions;
          initiating execution of a long latency instruction;
          stopping the processor clock; and
          restarting the instruction fetch unit after completion of the long latency instruction.

16. The apparatus of claim 15, wherein:
    the processor includes a pin to receive a signal having first and second states;
    the first state is to initiate execution of the plurality of micro-instructions; and
    the second state is to resume the processor clock to continue execution of the long latency instruction.

17. The apparatus of claim 15, wherein:
    the processor includes a halt instruction to initiate execution of the plurality of micro-instructions.

18. The apparatus of claim 15, wherein:
    the long latency instruction is a floating-point divide instruction.

19. The apparatus of claim 15, wherein:
    the long latency instruction has a programmable delay.

20. The apparatus of claim 15, wherein:
    the long latency instruction is an instruction requiring at least twenty five cycles of the processor clock to complete.

21. A computer system comprising:
    a control circuit to initiate stopping of a processor clock and to initiate resumption of the processor clock,
    a processor coupled to the control circuit and including:
       an instruction fetch unit;
       a processor clock;

micro-code storage in the processor coupled to the instruction fetch unit and the processor clock and containing a plurality of micro-instructions, wherein the micro-instructions comprise code to execute:
   stopping the instruction fetch unit from fetching instructions;
   initiating execution of a long latency instruction;
   stopping the processor clock;
   restarting the instruction fetch unit after completion of the long latency instruction.

22. The system of claim 21, wherein:

the processor includes a pin to receive a signal having first and second states;

the first state is to initiate execution of the plurality of micro-instructions the second state is to resume the processor clock to continue execution of the long latency instruction.

23. The system of claim 21, wherein:

the processor includes a halt instruction to initiate execution of the plurality of micro-instructions.

24. The system of claim 21, wherein:

the long latency instruction is a floating-point divide instruction.

25. The system of claim 21, wherein:

the long latency instruction has a programmable delay.

26. The system of claim 21, wherein:

the long latency instruction is an instruction requiring at least twenty five cycles of the processor clock to complete.

* * * * *